(12) United States Patent
Bao et al.

(10) Patent No.: US 6,665,127 B2
(45) Date of Patent: Dec. 16, 2003

(54) METHOD AND APPARATUS FOR ALIGNING A PHOTO-TUNABLE MICROLENS

(75) Inventors: Zhenan Bao, Millburn, NJ (US);
Timofei Nikita Kroupenkine, Warren, NJ (US); Alan Michael Lyons, New Providence, NJ (US); Mary Louise Mandich, Martinsville, NJ (US); Louis Thomas Manzione, Summit, NJ (US); Elsa Reichmanis, Westfield, NJ (US); Shu Yang, North Plainfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 5 days.

(21) Appl. No.: 10/135,973

(22) Filed: Apr. 30, 2002

(65) Prior Publication Data

US 2003/0202256 A1 Oct. 30, 2003

(51) Int. Cl.$^7$ ................................................. G02B 1/06
(52) U.S. Cl. ...................................................... 359/665
(58) Field of Search ................................. 359/254, 620, 359/665, 666, 245

(56) References Cited

U.S. PATENT DOCUMENTS 5,428,711 A * 6/1995 Akiyama et al. .............. 706/40
6,538,823 B2 * 3/2003 Kroupenkine et al. ...... 359/665

* cited by examiner

*Primary Examiner*—Georgia Epps
*Assistant Examiner*—Tuyen Tra
(74) *Attorney, Agent, or Firm*—David W. Herring, Jr.

(57) ABSTRACT

A tunable microlens uses a layer of photo-conducting material which results in a voltage differential between at least one of a plurality of electrodes and a droplet of conducting liquid when a light beam is incident upon the photo-conducting material. Such droplet, which forms the optics of the microlens, moves toward an electrode with higher voltage relative to other electrodes in the microlens. Thus, for example, when the light beam is misaligned with the microlens, the voltage differential causes the droplet, and hence the microlens, to realign itself with the beam.

16 Claims, 8 Drawing Sheets

METHOD AND APPARATUS FOR ALIGNING A PHOTO-TUNABLE MICROLENS

FIELD OF THE INVENTION

The present invention relates to microlenses, and more particularly, to liquid microlenses.

BACKGROUND OF THE INVENTION

Lasers, photoconductors, and other optical components are widely used in many optoelectronic applications such as, for example, optical communications systems. Traditionally in such applications, manual positioning and tuning is required to maintain the desired optical coupling between the system components. However, such manual positioning can be slow and quite expensive.

More recently, in attempts to eliminate this manual positioning, small tunable lenses (also known as tunable microlenses) were developed to achieve optimal optical coupling. Typically, these microlenses are placed between an optical signal transmitter, such as a laser, and an optical signal receiver, such as a photodetector. The microlens acts to focus the optical signal (e.g., that is emitted by the laser) onto its intended destination (e.g., the photodetector). In some cases the refraction index of these microlenses is automatically varied in order to change the focus characteristics of the microlens when the incidence of a light beam upon the microlens varies from its nominal, aligned incidence. Thus, the desired coupling is maintained between components of the microlens. Therefore, the manual positioning and adjustment required in previous systems is eliminated.

Most tunable microlenses are either gradient index (GRIN) lenses with the refractive index controlled electrostatically or flexible polymeric lenses with the shape (and, therefore, the focal length) controlled mechanically. Both technologies have inherent limitations that impose severe restrictions on the performance of these existing tunable microlenses.

Tunable gradient index lenses have inherent limitations associated with the relatively small electro-optic coefficients found in the majority of electrooptic materials. This results in a small optical path modulation and, therefore, requires thick lenses or very high voltages to be employed. In addition, many electro-optic materials show strong birefringence that causes polarization dependence of the microlens, which distorts light with certain polarization.

Mechanically adjustable flexible lenses typically have a substantially wider range of tunability than the gradient index lenses. However, they require external actuation devices, such as micropumps, to operate. Integration of such actuation devices into optoelectronic packages involves substantial problems associated with their miniaturization and positioning. These become especially severe in the case where a two-dimensional array of tunable microlenses is required.

Attempts have also been made to use other technologies to produce tunable microlenses, such as liquid microlenses controlled through self-assembled monolayers. Some of these attempts are described in U.S. Pat. No. 6,014,259, issued Jan. 11, 2000, the entirety of which is hereby incorporated by reference herein. Microlenses utilizing self-assembled monolayers, however, also suffer from several problems, including severe limitations on material selection and strong hysteresis often leading to the failure of the microlens to return to an original shape after a tuning voltage is disconnected.

None of the above-described microlenses allow for both lens position adjustment and focal length tuning. Therefore, more recent attempts have involved developing liquid microlenses that permit such lens position and focal length adjustments. Examples of such microlenses, which utilize electrowetting principles coupled with external electronic control systems to accomplish these adjustments, are described in Applicants'copending U.S. patent applications Ser. No. 09/884,605 now U.S. Pat. No. 6,538,823 filed Jun. 19, 2001, entitled "Tunable Liquid Microlens" and Ser. No. 09/951,637 now U.S. Pat. No. 6,545,815 filed Sep. 13, 2001, entitled "Tunable Liquid Microlens With Lubrication Assisted Electrowetting."

SUMMARY OF THE INVENTION

We have recognized that, while the '605 and '637 applications provide exemplary electrowetting-based tunable liquid microlenses, there remains a need to provide a tunable liquid microlens that does not rely on an external electronic control system to detect out of alignment conditions and adjust the position and/or focal length of the microlens. In particular, in certain applications it may be advantageous to have a microlens that is self-tunable. Such a microlens would eliminate the cost and effort associated with integrating the microlens control electronics previously necessary to tune electrowetting-based microlenses and would potentially reduce the tuning time.

Therefore, we have invented a microlens that uses a layer of photo-conducting material (such as a conjugated polymer, a doped charge transporting polymer, or certain inorganic semiconductors) to create a voltage differential between at least one of a plurality of electrodes and a droplet of conducting liquid. Such a droplet, which forms the optics of the microlens, will move toward an electrode with a higher voltage relative to other electrodes in the microlens.

One embodiment of such a self-tunable microlens comprises a transparent conducting substrate of a material (such as transparent glass) that is transparent to at least one wavelength of light useful in an optical system. A plurality of electrodes is disposed on the aforementioned photoconducting material in a way such that they may be selectively biased to create a respective voltage potential between the droplet and each of the plurality of electrodes. The photo-conducting material is, in turn, disposed on the transparent conducting substrate between the light beam source and the plurality of electrodes. A layer of dielectric insulating material separates the plurality of electrodes and the photo-conducting material from the droplet of conducting liquid.

When light is incident upon the photo-conducting material, a leakage current results. When a light beam is equally incident on the photo-conducting material associated with each electrode in the layer of electrodes, the leakage current through each electrode is equal and the droplet remains in its initial, centered position. However, when the light beam becomes misaligned with the electrode pattern such that it is incident more upon one segment of photoconducting material than the others, a greater leakage current develops in that segment than otherwise would be present when the light beam is incident equally upon all segments. This greater current also causes the voltage across the electrode associated with that segment to decrease. An electrical circuit coupled with each electrode detects this change in current (or voltage) and then adjusts the voltages applied to each electrode in such a manner as to ensure that a higher voltage is applied to the electrode(s) toward which the droplet must move in order for the microlens to be aligned with the light beam.

In another embodiment of the present invention, the microlens requires no electrical circuit to adjust the voltages across the electrodes to achieve the droplet's desired location. Instead, two layers of electrodes are used, an upper layer and a lower layer. Each electrode in the lower layer of electrodes is electrically coupled to the electrode in the upper layer directly opposed to that electrode in the lower layer. Thus, as described above, when a light beam becomes more incident upon the photo-conducting layer of material associated with one electrode in the lower layer, the larger leakage current through this electrode develops and, as a result, the voltage across that electrode drops. The result is that the voltage also drops in the opposing electrode in the upper layer to which that electrode in the lower layer is connected. The resulting voltage differential between the droplet and the electrodes in the upper layer is such that the droplet moves automatically toward the lower layer electrode with the lowest voltage (i.e., toward the position of greatest incidence with the light beam).

DETAILED DESCRIPTION OF THE INVENTION

Figure 1:
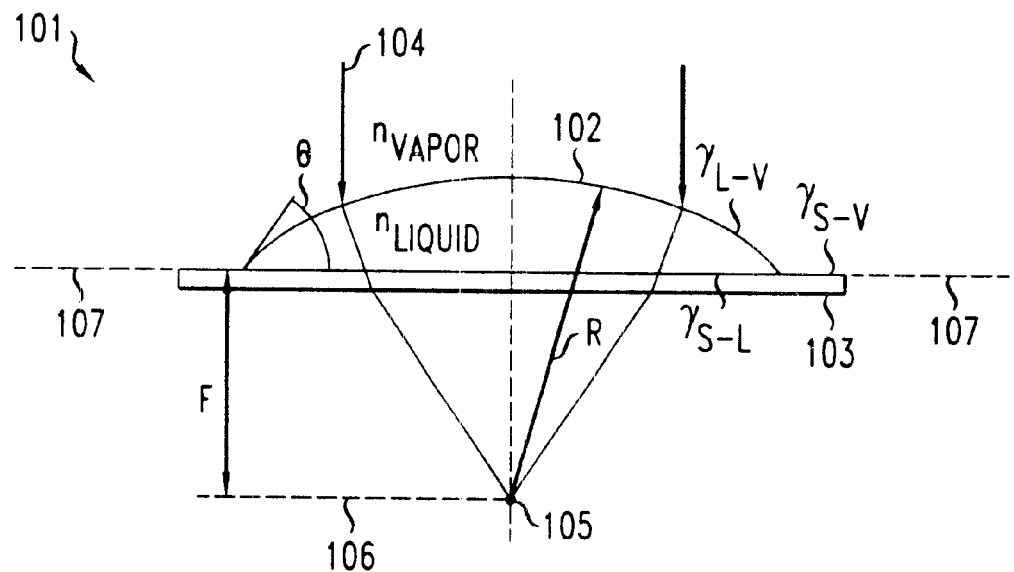
FIG. 1 shows a prior art microlens and its operational effect on a beam of light.

FIG. 1 shows a prior art embodiment of a liquid microlens 101 including a small droplet 102 of a transparent liquid, such as water, typically (but not necessarily) with a diameter from several micrometers to several millimeters. The droplet is disposed on a transparent substrate 103 which is typically hydrophobic or includes a hydrophobic coating. The droplet 102 and substrate 103 need only be transparent to light waves having a wavelength within a selected range. Light waves 104 pass through the liquid microlens focal point/focal spot 105 in a focal plane 106 that is a focal distance "f" from the contact plane 107 between the droplet 102 and the substrate 103.

The contact angle θ between the droplet and the substrate is determined by interfacial surface tensions (also known as Interfacial energy) "Y", generally measured in milli-Newtons per meter (mN/m). As used herein, $\gamma_{S-V}$ is the interfacial tenson between the substrate 103 and the air, gas or other liquid that surrounds the substrate, $\gamma_{L-V}$ is the interfacial tension between the droplet 102 and the air, gas or other liquid that surrounds the droplet, and $\gamma_{S-L}$ is the interfacial tension between the substrate 103 and the droplet 102. The contact angle θ may be determined from equation (1):

$$\cos\theta = (\gamma_{S-V} - \gamma_{S-L})/\gamma_{L-V} \qquad \text{Equation (1)}$$

The radius "R" in meters of the surface curvature of the droplet is determined by the contact angle θ and the droplet volume in cubic meters ($m^3$) according to equation (2) as follows:

$$R^3 = 3 * (\text{Volume})/[\pi * (1-\cos\theta)(2-\cos^2\theta - \cos\theta)] \qquad \text{Equation (2)}$$

The focal length in meters is a function of the radius and the refractive indices "n", where $n_{liquid}$ is the refractive index of the droplet and $n_{vapor}$ is the refractive index of the air, gas or other liquid that surrounds the droplet 102. The focal length f may be determined from Equation (3):

$$f = R/(n_{Liquid} - n_{vapor}) \qquad \text{Equation (3)}$$

The refractive index of the substrate 103 is not critical because of the parallel entry and exit planes of the light waves. The focal length of the microlens 101, therefore, is a function of the contact angle θ.

Figure 2:
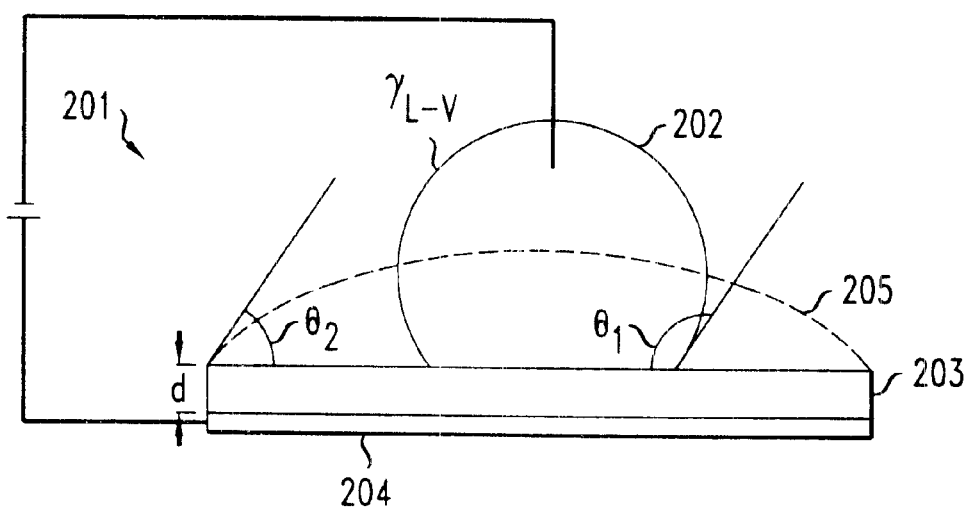
FIG. 2 shows a prior art microlens wherein a voltage differential between an electrode and a droplet of conducting liquid is used to adjust the focal length of the lens.

FIG. 2 shows a prior art microlens 201 whereby the phenomenon of electrowetting may be used to reversibly change the contact angle θ between a droplet 202 of a conducting liquid (which may or may not be transparent) and a dielectric insulating layer 203 having a thickness "d" and a dielectric constant $\epsilon_r$. An electrode 204, such as metal electrode is positioned below the dielectric layer 203 and is insulated from the droplet 202 by that layer.

The droplet 202 may be, for example, a water droplet, and the dielectric insulating layer 203 may be, for example, a Teflon/Parylene surface.

When no voltage difference is present between the droplet 202 and the electrode 204, the droplet 202 maintains its shape defined by the volume of the droplet and contact angle $\theta_1$, where $\theta_1$ is determined by the interfacial tensions γ as explained above. When a voltage V is applied to the electrode 204, the voltage difference beetweeen the electrode 204 and the droplet 202 causes the droplet to spread. The dashed line 205 illustrates that the droplet 202 spreads equally across the layer 203 from its central position relative to the electrode 204. Specifically, the contact angle θ decreases from $\theta_1$ to $\theta_2$ when the voltage is applied between the electrode 204 and the droplet 202. The voltage V necessary to achieve this spreading may range from several volts to several hundred volts. The amount of spreading, i.e., as determined by the difference between $\theta_1$ and $\theta_2$, is a function of the applied voltage V. The contact angle $\theta_2$ can be determined from equation (4):

$$\cos\theta(V) = \cos\theta(V=0) + V^2(\epsilon_0\epsilon_r)/(3d\gamma_{L-V}) \qquad \text{Equation (4)}$$

where cos θ(V=0) is the contact angle between the insulating layer 203 and the droplet 202 when no voltage is applied between the droplet 202 and electrode 204; $\gamma_{L-V}$ is the droplet interfacial tension described above; $\epsilon_r$ is the dielectric constant of the insulating layer 203; and $\epsilon_0$ is $8.85 \times 10^{-12}$ F/M—the permissivity of a vacuum.

Figure 3A:
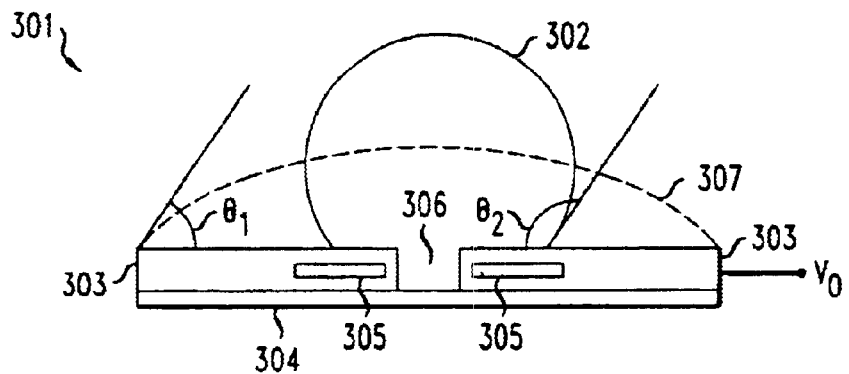
FIGS. 3A and 3B show a prior art microlens wherein the droplet of conducting liquid is electrically coupled to a substrate via a well.
Figure 3B:
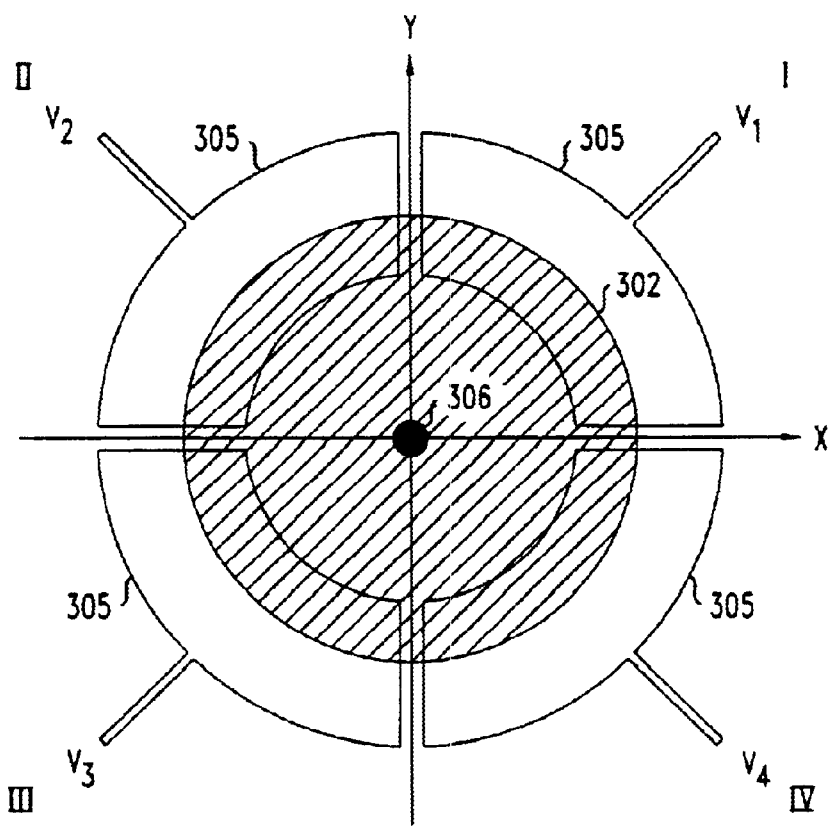

FIGS. 3A and 3B illustrate a prior art tunable liquid microlens 301 that is capable of varying both position and focal length. Referring to FIG. 3A, a tunable liquid microlens 301 includes a droplet 302 of a transparent conductive liquid disposed on a first surface of a transparent, dielectric insulating layer 303. The microlens 301 includes a plurality of electrodes 305 insulated from the droplet 302 by the insulating layer 303. A conducting transparent substrate 304 supports the electrodes 305 and the insulating layer 303 and is connected to the droplet 302 via a well 306 running through the dielectric insulating layer 303. Thus, when voltage $V_O$ is passed over the conducting transparent substrate 304, the droplet 302 also experiences voltage $V_O$.

FIG. 3B is a top plan view of an illustrative configuration for the electrodes 305. Each electrode is coupled to a respective voltage $V_1$ through $V_4$ and the droplet 302, which is centered initially relative to the electrodes, is coupled to a voltage $V_O$ via the well 306. When there is no voltage difference between the droplet 302 and any of the electrodes 305 (i.e., $V_1=V_2=V_3=V_4=V_O$), and the droplet 302 is centered relative to the electrodes and quadrants I thru IV, the droplet 302 assumes a shape as determined by contact angle $\theta_1$ and the volume of droplet 302 in accordance with equations (1)–(3) expained above. The position of the droplet 302 and the focal length of the microlens can be adjusted by selectively applying a voltage potential between the droplet 302 and the electrodes 305. If equal voltages are applied to all four electrodes (i.e., $V_1=V_2=V_3=V_4 \neq V_O$), then the droplet 302 spreads equally within quadrants I, II, III and IV (i.e., equally along lateral axes X and Y). Thus, the contact angle θbetween the droplet 302 and insulating layer 303 decreases from $\theta_2$ to $\theta_1$ in FIG. 3A. The resulting shape of the droplet 302 is shown as the dashed line 307 in FIG. 3A. This new shape of the droplet 302 with contact angle $\theta_1$ increases the focal length of the microlens 301 from the focal length of the microlens with the initial contact angle $\theta_2$ (i.e., when $V_1=V_2=V_3=V_4=V_O$).

Figure 4:
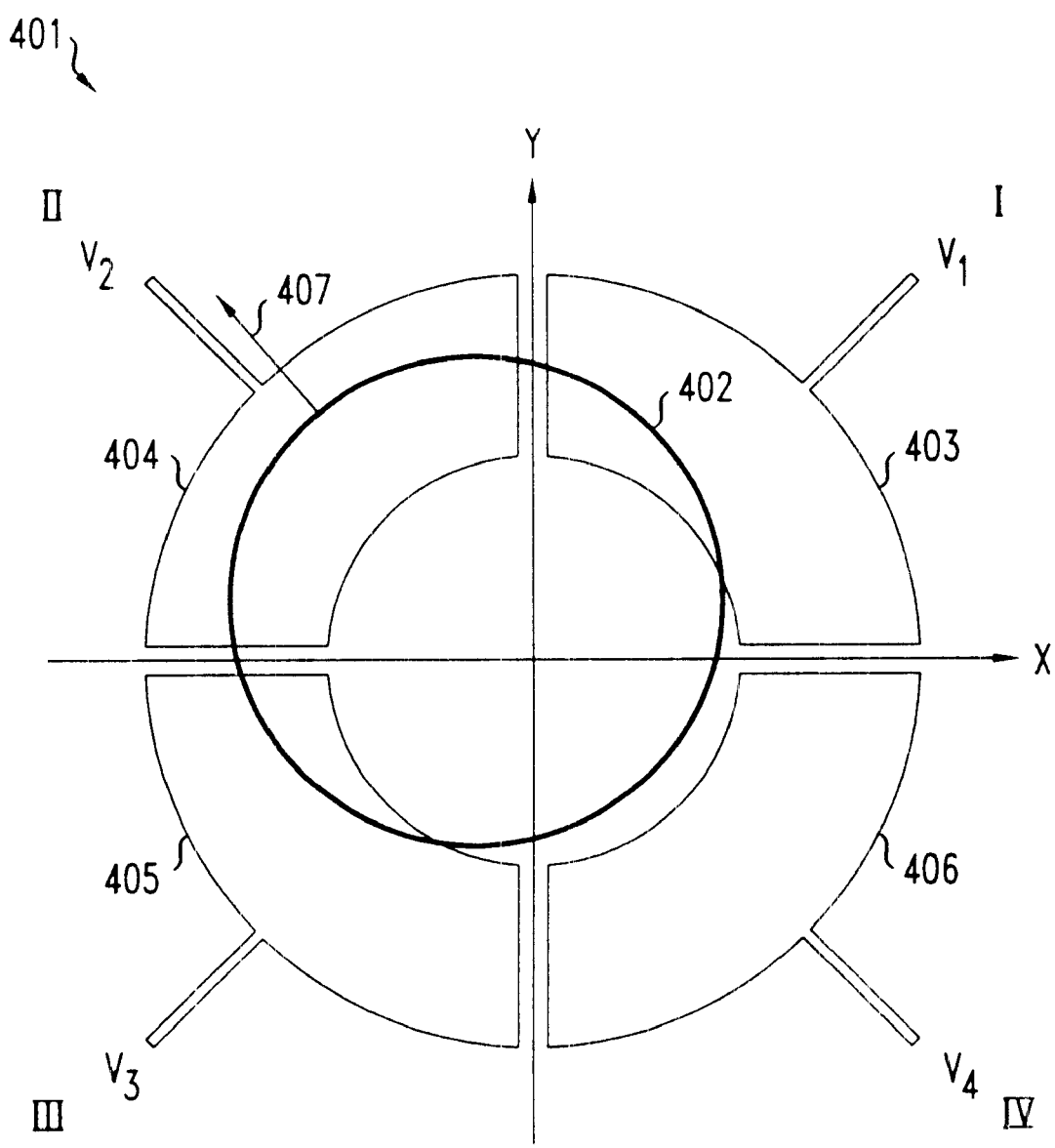
FIG. 4 shows the prior art microlens of FIGS. 3A and 3B wherein a voltage selectively applied to one or more electrodes results in a movement of the droplet away from its centered position relative to the electrodes.

FIG. 4 shows the prior art microlens of FIG. 3A and FIG. 3B wherein the lateral positioning of the droplet, 301 in FIGS. 3A and 3B, along the X and Y axes can also be changed relative to the initial location of the droplet by selectively applying voltages to one or more of the electrodes, 305 in FIGS. 3A and 3B. For example, referring to FIG. 4, by making $V_1=V_3=V_O$ and by making $V_2$ greater than $V_4$, the droplet 402 is attracted toward the higher voltage of the electrode 404 and thus moves in direction 407 toward quadrant II. As discussed above, by adjusting the lateral position of the droplet 402, the lateral position of the focal spot of the microlens 401 in that microlens'focal plane is also adjusted. Thus, by selectively adjusting the voltage applied to one or more of the electrodes 403, 404, 405 and 406 relative to the droplet 402 in different combinations, the focal length and the lateral position of the microlens 401 can be selectively adjusted.

While the prior art electrowetting-based microlens embodiments described above are useful in certain applications, they are also limited in certain aspects of their usefulness. For example, all prior art electrowetting microlenses rely on an external control system to detect out of alignment conditions and vary the voltage differential between the droplet and the electrodes. Such control systems tend to be expensive to manufacture. Also, integration of these systems into an optoelectronic package (for use, e.g., in an optical telecommunications switch) is difficult. Additionally, since the position of the light beam is not a priori known, some sort of a search and optimization algorithm has to be employed to discover the ideal alignment conditions. This might result in a substantial increase in the time necessary to complete the tuning process. Thus, there remains a need to provide a tunable liquid microlens that does not rely on an external electronic control system to detect out of alignment conditions and adjust the position and/or focal length of the microlens. In particular, in certain applications it may be advantageous to have a microlens that is self-tunable. Such a microlens would eliminate the cost and effort associated with integrating the microlens control electronics previously necessary to tune electrowetting-based microlenses.

Figure 5:
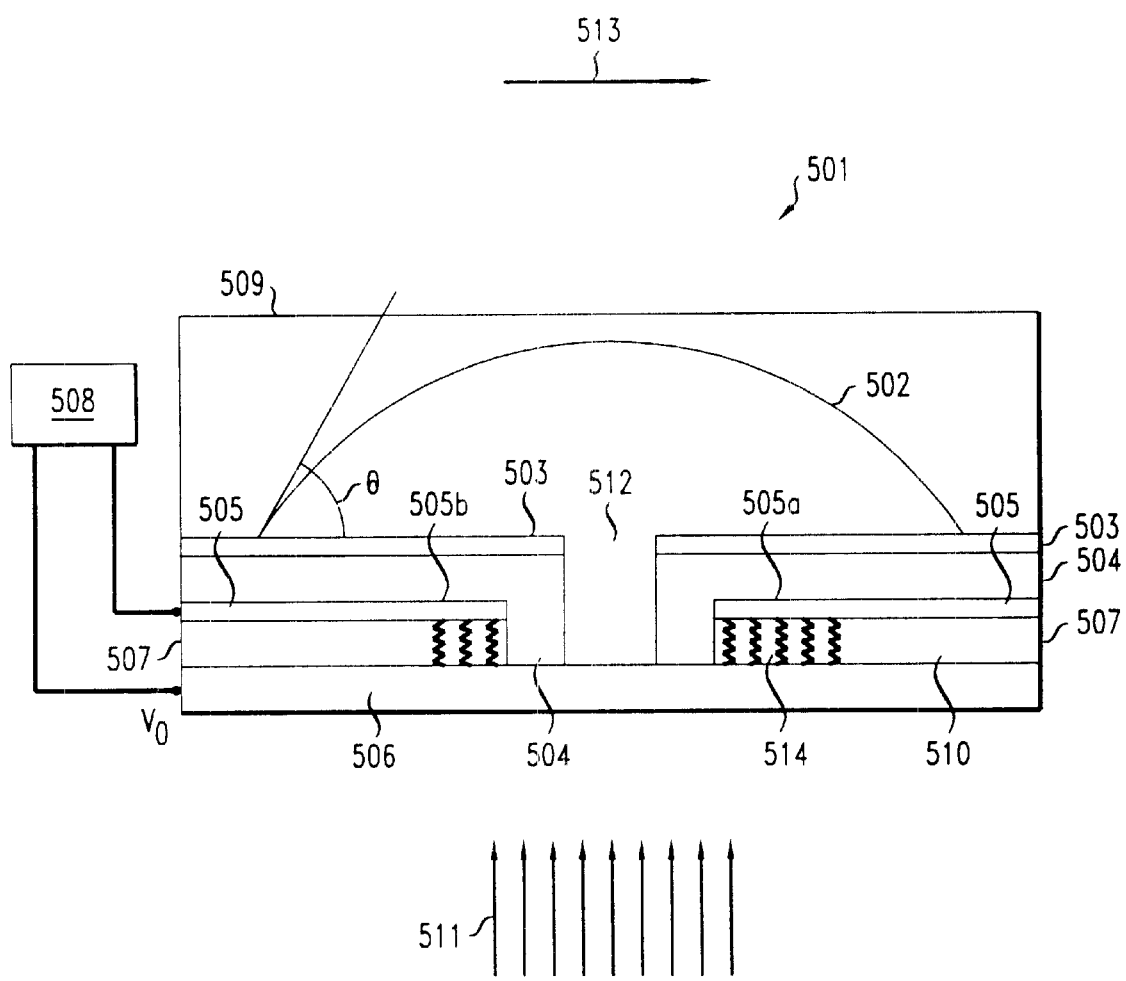
FIG. 5 shows a microlens in accordance with the present invention wherein a layer of photo-conducting material is used with a single layer of electrodes to create a voltage difference to adjust the position of the microlens.

FIG. 5 shows a first embodiment of the present invention wherein a self-tunable liquid microlens 501 includes a droplet 502 of a transparent conductive liquid disposed on a first surface of a hydrophobic layer 503 which is in turn disposed on a dielectric insulating layer 504. Illustrative dielectric insulating materials include the aforementioned Teflon/Parylene surface. Alternatively, the dielectric insulating layer 504 could be made of a hydrophobic material, thus eliminating the need for a separate hydrophobic layer 503. The microlens 501 includes a plurality of electrodes 505, shown in cross section in FIG. 5 as electrodes 505a and 505b, each of which is disposed on a layer of photoconducting material 507. Suitable photoconducting materials include, but are not limited to, conjugated polymers, doped charge transporting polymers (such as poly[2-methoxy-5-(2'-ethyl-hexyloxy)-1,4-phenylene vinylene] (MEH-PPV)+ C60), or certain inorganic semiconductors (such as PbS, HgCdTe, or $Cd_{1-x}Mn_xTe$). Alternatively, a photovoltaic material, such as InP, CdX, GaAs, or CdTe, may be used. The electrodes 505 and the photoconducting material 507 are insulated from the droplet 502 by the dielectric insulating layer 504. A conducting transparent substrate 506, such as a substrate made from transparent glass, supports the electrodes 505, the insulating layer 504 and the photoconducting material 507, and is connected to the droplet 502 via a well 512 running through the hydrophobic layer 503 and the dielectric insulating layer 504. A voltage $V_O$ is applied to the conducting transparent substrate 506 and, hence, the droplet 502. The droplet 502 may advantageously be enclosed in an enclosure liquid or gas 509.

When a light beam 511 of a selected wavelength, such as that generated by a laser, is incident upon a particular segment of photoconducting material, such as segment 510, a current 514 develops between the conducting transparent substrate 506 and the electrode 505a associated with the segment of photo-conducting material 510. As the light beam 511 overlaps a larger portion of the photo-conducting material 510 and electrode 505a (which would occur, for example, if the light beam becomes misaligned with the microlens), current 514 rises. If a photovoltaic material is used, instead of the photoconducting material, when light is incident upon the material a voltage is created in that material. The photovoltaic material is oriented such that the voltage over the electrode drops. Thus, when either a photoconducing material or a photovoltaic material is used, the voltage difference between electrode 505a and the conducting transparent substrate 506 (and, hence, the droplet 502) drops. Since the conducting droplet will tend to move toward an electrode with a higher voltage, the tendency in this case would be for the droplet to move toward electrode 505b (i.e, because the voltage across electrode 505a is lower than that across electrode 505b). However, this movement would be the opposite of the movement necessary to align the droplet with the light beam. Therefore, in response to a drop in voltage across electrode 505a, electronic circuit 508 raises the voltage applied to electrode 505a relative to electrode 505b, causing the droplet to be attracted toward electrode 505a and, thus, aligning the droplet 502 with the beam 511. The electronics necessary achieve this variation in voltage are readily apparent to one skilled in the art. It is noteworthy that, unlike in prior art embodiments, electronic circuit 508 does not serve as an external control mechanism to detect out-of-alignment conditions between the beam 511 and the microlens 501 and, as a result, adjust voltages. Rather, in this embodiment of the present invention, the electronic circuit only distributes a higher voltage to electrode 505a or a lower voltage to electrode 505b in response to the voltage changes in the microlens itself in order to move the droplet in direction 513 to align it with the light beam 511.

Figure 6:
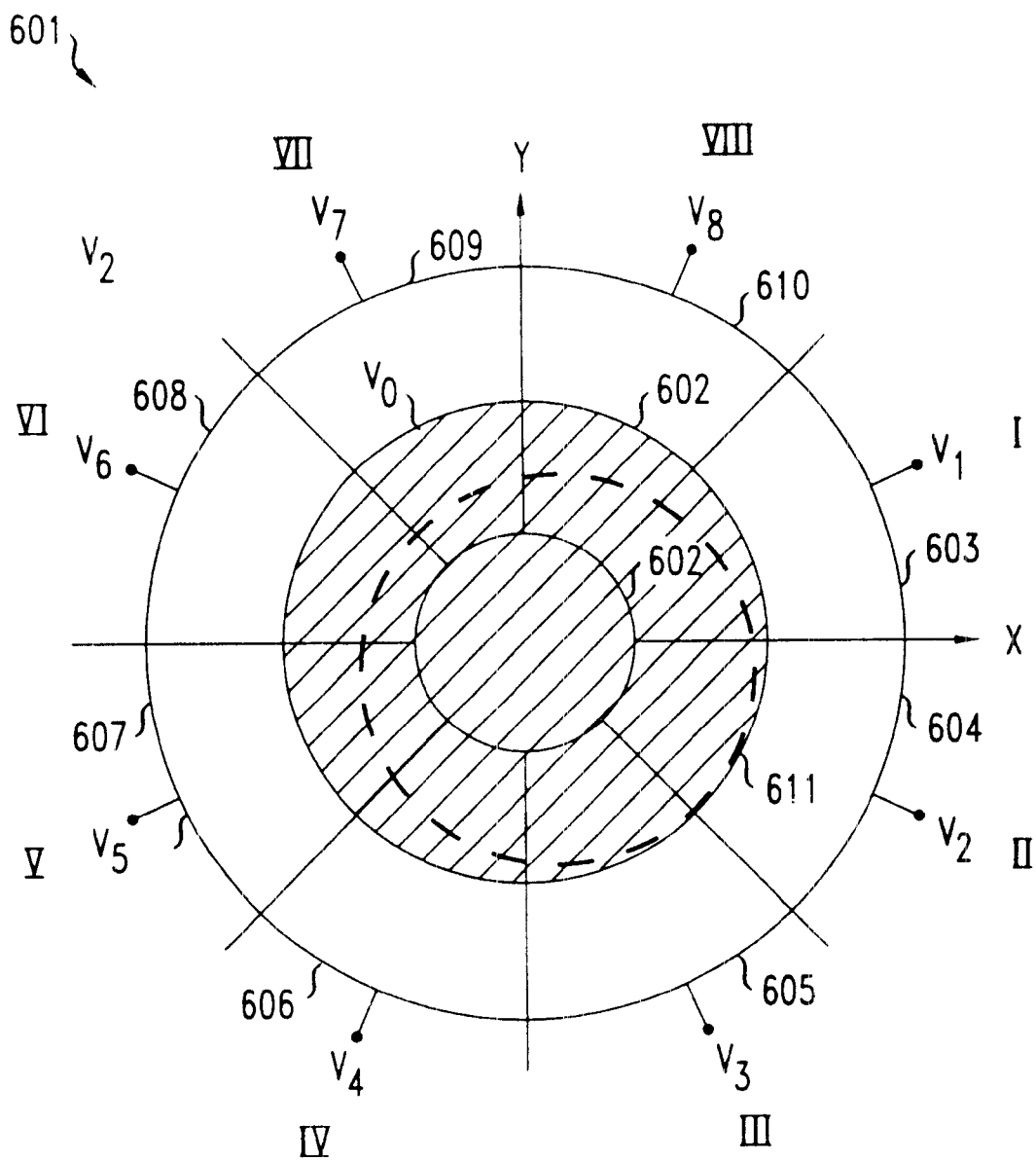
FIG. 6 shows a top plan view of the microlens of FIG. 5, wherein the droplet of conducting liquid moves in response to a distribution of voltages from an electrical circuit to align itself with a light beam.

FIG. 6 is a top plan view of microlens 501 in FIG. 5 and illustrates one illustrative configuration of the electrodes 505 in that figure. One skilled in the art will recognize that there are other equally advantageous configurations of electrodes 505 that are intended to be encompassed by the embodiments of the present invention. Referring to FIG. 6, each electrode 603–610 is coupled to a respective voltage $V_1$ through $V_8$. Droplet 602, which is centered initially relative to the electrodes 603–610, is coupled to a voltage $V_O$ via the well 612. When there is no voltage difference between the droplet 602 and any of the electrodes (i.e., $V_1=V_2=V_3=V_4=V_5=V_6=V_7=V_8=V_O$) droplet 602 is centered relative to the electrodes and each of segments I thru VIII. Additionally, the droplet 602 assumes a shape as determined by the contact angle θ in FIG. 5 and the volume in accordance with equations (1)–(3) expained above. Also as described above, the position of the droplet 602 and the focal length of the microlens 601 can be adjusted by selectively applying a voltage difference between the droplet 602 and selected individual electrodes 603–610.

Figure 7:
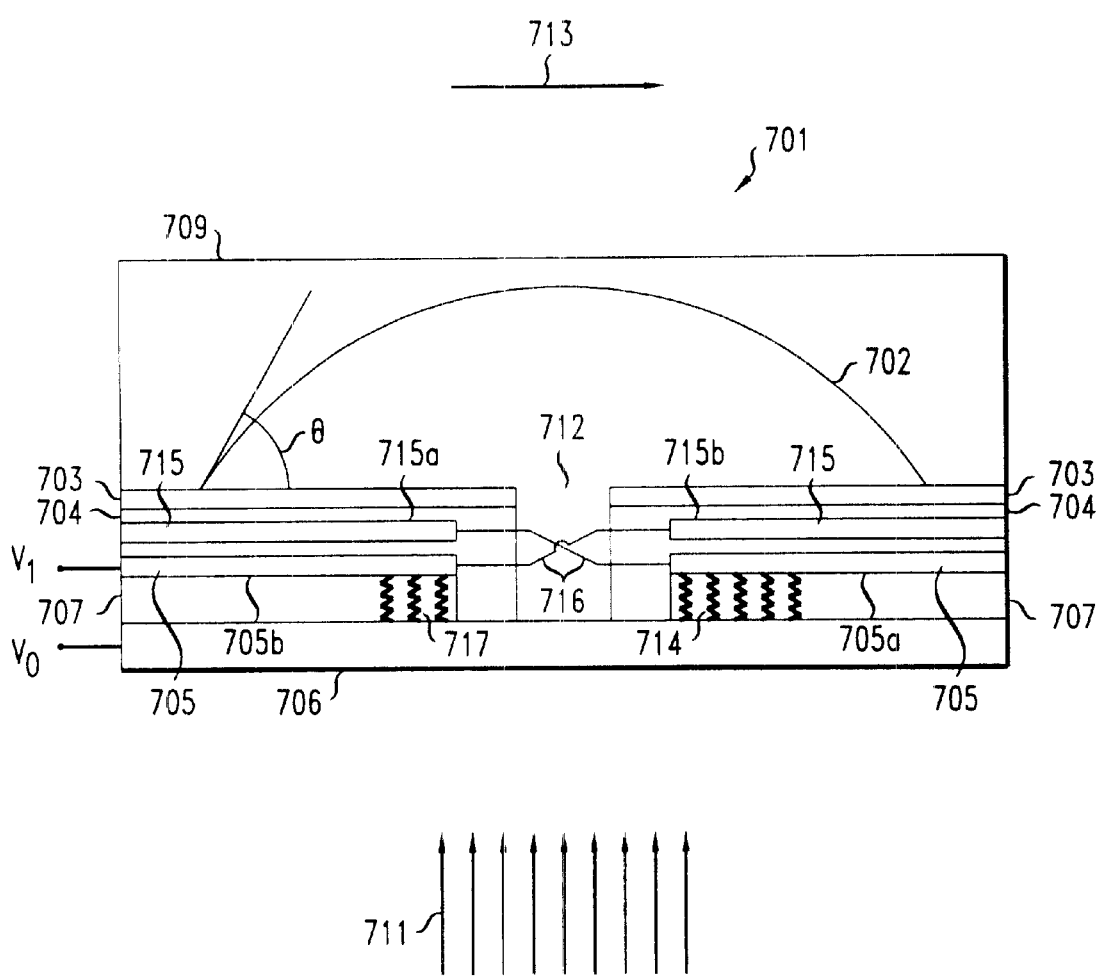
FIG. 7 shows a microlens in accordance with the present invention wherein a layer of photo-conducting material is used with two layers of electrodes to automatically adjust the position of the droplet of conducting liquid.
Figure 8:
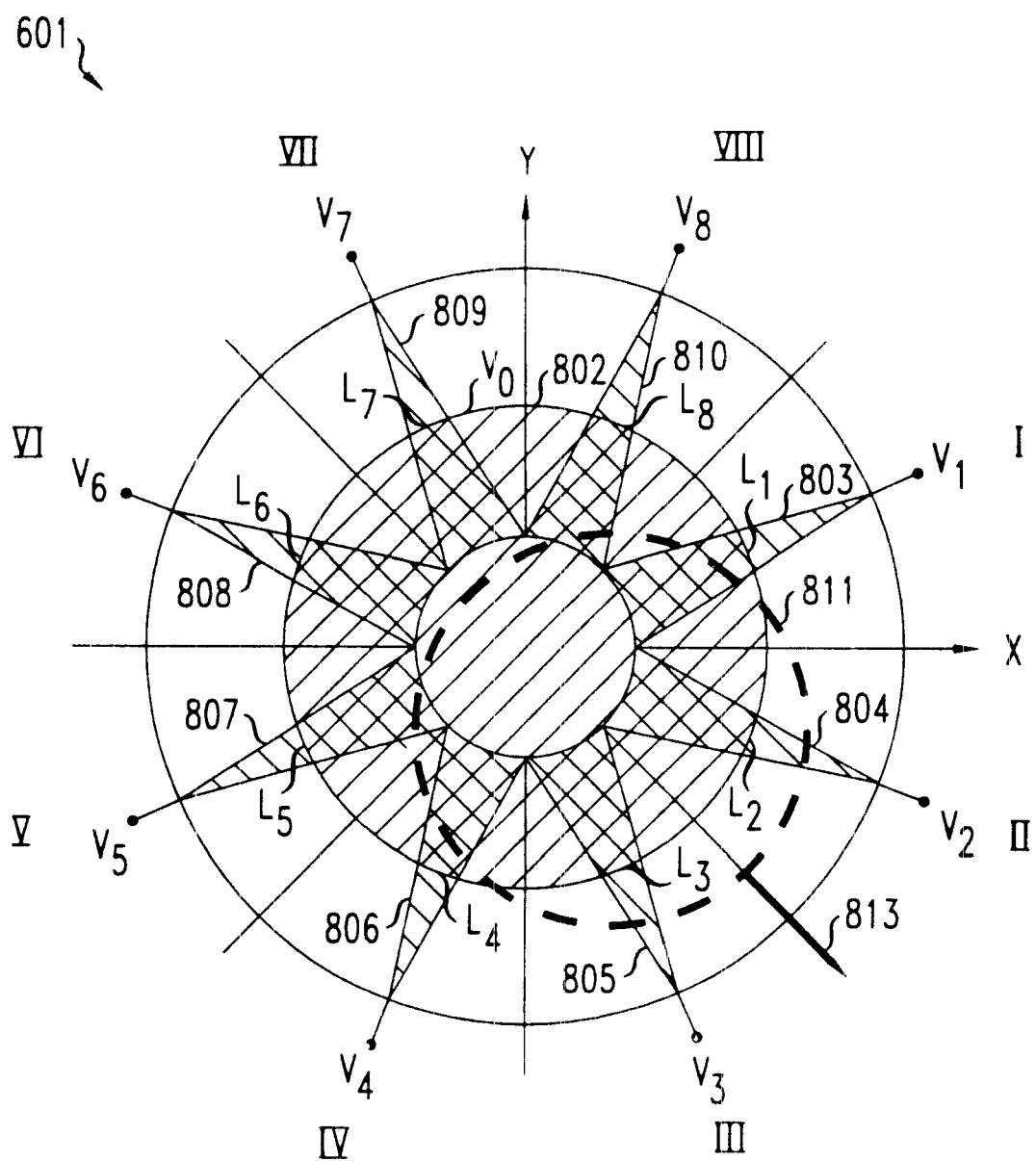
FIG. 8 shows a top plan view of the microlens of FIG. 7 wherein the droplet of conducting liquid moves in response to a voltage differential within the microlens to align itself with a light beam.
Figure 9:
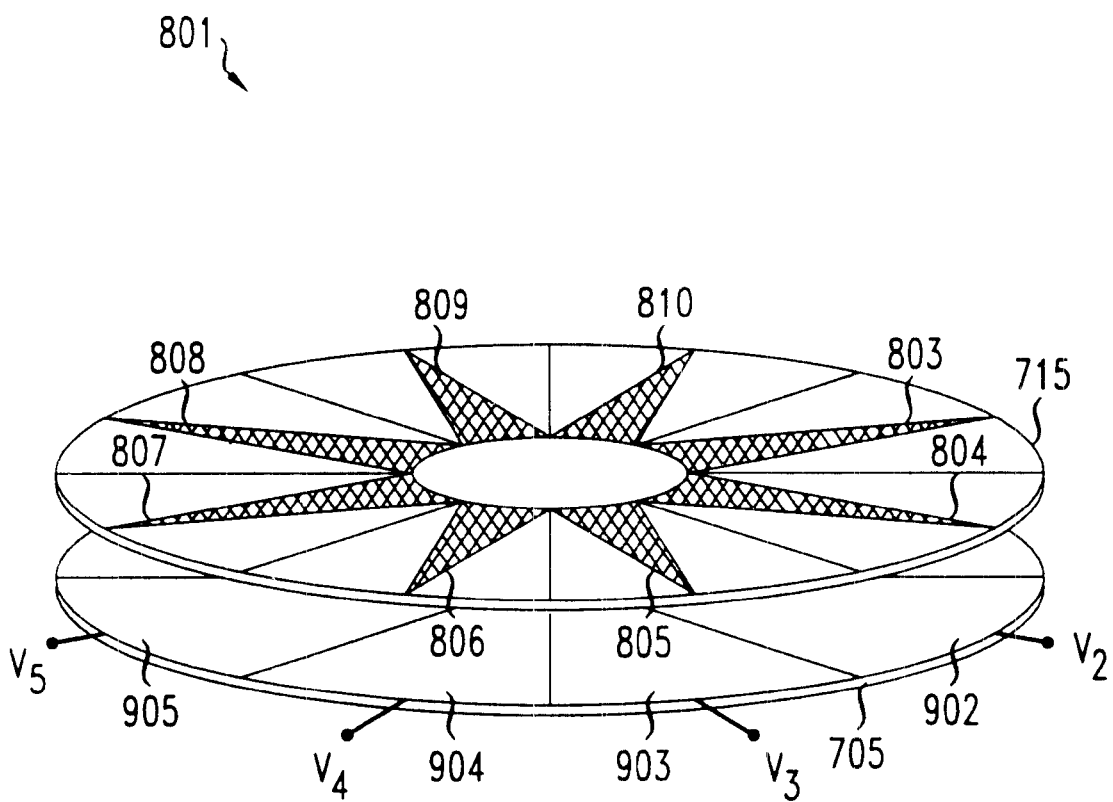
FIG. 9 shows a three dimensional representation of the two layers of electrodes of the microlens in FIGS. 7 and 8.

Because the embodiment of FIG. 5 and FIG. 6 relies on an external electronic circuit to adjust the voltage of the electrodes, this embodiment is said to be an "active" microlens. FIGS. 7, 8 and 9 show an embodiment of the microlens of the present invention that is "passive"—that is, requires no external voltage-adjusting mechanism to adjust the position of the droplet. FIG. 7 shows that the microlens 701 of this embodiment is structurally similar to the microlens of FIGS. 5 and 6, with the addition of a second, upper layer 715 of electrodes (hereinafter referred to as "second layer") that is electrically connected via leads 716 to the first, lower layer 705 of electrodes (hereinafter referred to as "first layer"). This connection is such that each of the first layer 705 of electrodes is electrically connected to an opposing electrode in the second layer 715. This second layer 715 of electrodes is disposed within the dielectric insulating layer 704 above the first layer 705 of electrodes and is thus insulated by that dielectric layer from the droplet 702, the first layer 705 of electrodes, the photo-conducting layer 707, and the transparent conducting substrate 706. The electrical connections between the first-layer electrodes and second-layer electrodes result in equal voltages between a particular electrode in the first layer (such as electrode 705a) and its counterpart opposing electrode in the upper layer (in this case, electrode 715a). Thus, when the light beam 711 is incident equally upon the photoconducting material associated with electrodes in the first layer 705 (i.e., the light beam is aligned with the microlens), each of the electrodes in the first layer (and, hence, each of the corresponding opposing electrodes in the second layer) will be biased equally with respect to the conducting transparent substrate 706. Thus, the droplet 702 is aligned with the beam 711 and will not move relative to the upper electrodes 715.

FIG. 8 is a top plan view of microlens 701 in FIG. 7 and illustrates one illustrative configuration of the second, upper layer 715 of electrodes in that figure. Referring to FIG. 8, each electrode 803 through 810 are disposed in a star pattern, with wedge-like gaps between each electrode, such that the surface area of the electrode decreases as the distance from the center well increases. One skilled in the art will recognize that there are other equally advantageous configurations of this upper layer 715 of electrodes hat are intended to be encompassed by the embodiments of the present invention. Each electrode 803–810 in the upper layer is coupled to its opposing electrode in the first, lower layer, 705 in FIG. 7, of electrodes. Referring to FIG. 9, showing an exemplary configuration of the upper and lower electrode planes 715 and 705 in FIG. 7, respectively, electrodes 808, 809, 810 and 803 are connected, respectively, to opposing electrodes 902, 903, 904 and 905. This same illustrative connection configuration is followed for each of electrodes 803–810 in FIG. 8, wherein each is electrically coupled to its opposing electrode in the first, lower layer. Each of the electrodes in the first, lower layer of electrodes is, in turn, coupled to a voltage $V_1$, through $V_8$. Droplet 802, which is responsive to and initially centered relative to the electrodes 803–810 in the second, upper layer, is coupled to a voltage $V_O$ via the well 812 leading to the conducting transparent substrate, 706 in FIG. 7.

When there is no voltage difference between the droplet 802 and any of the electrodes in the first, lower layer (i.e., $V_1=V_2=V_3=V_4=V_5=V_6=V_7=V_8=V_O$), the droplet 802 will remain centered relative to the upper level electrodes and each of segments I thru VIII. However, when a voltage difference exists between the droplet 802 and individual electrodes in the first layer, the position of the droplet 802 is automatically adjusted.

For example, referring once again to FIG. 7, the light beam 711 is not initially aligned with the microlens 701. A greater portion of the light beam 711 is, for example, incident upon electrode 705a. Thus, the leakage current 714 that develops in the segment of photo-conducting material corresponding to electrode 705a is greater than the current 717 corresponding to electrode 705b. It follows that the voltage $V_1$ applied to electrode 705b is greater than the voltage $V_2$ applied to electrode 705a. Since electrode 715b is electrically connected to electrode 705b, and electrode 715a is connected to electrode 705a, electrode 715b also experiences voltage $V_1$ and electrode 715a experiences voltage $V_2$. The droplet 702, with applied voltage $V_O$, will move toward the higher voltage $V_1$, in direction 713. Thus, the microlens 701 in this embodiment is self-aligning in that the droplet 702 will automatically move to align itself with the light beam with no external control apparatus.

Referring once again to FIG. 8, which shows a top plan view of FIG. 7, a greater portion of the cross-section of the mis-aligned light beam 811 is incident upon the first, lower layer of electrodes in segments I, II, III and IV, than is incident upon the first, lower layer of electrodes in segments V, VI, VII and VIII, respectively. Thus, the voltages $V_5$, $V_6$, $V_7$ and $V_8$ across the lower layer of electrodes are higher than the voltages $V_1$, $V_2$, $V_3$ and $V_4$, respectively. As previously discussed, therefore, the upper electrodes 803–806 in segments I,II, III and IV, respectively, will experience a higher voltage than the upper electrodes 807–810 in segments V, VI, VII and VIII respectively. Since the droplet 802 will move toward those upper electrodes with the highest voltage, the droplet will move in approximately direction 813 to align itself with the light beam 811. The driving force needed to move the droplet in direction 813 is directly proportional to the square of the voltage ($V^2$) across each electrode multiplied by the intersection $L_n$ between the outer circumference of the droplet and each of the electrodes. The upper electrodes are disposed in a star-like pattern with wedge-like gaps between the electrodes (or other equally advantageous configuration) in a way such that the length of the intersection of the circumference of the droplet and a particular electrode will decrease as the droplet moves in the direction of that particular electrode. As a result, the driving force will decrease as the droplet 802 moves in direction 813. The droplet 802 will move in direction 813 until $V_1^2*L_5=V_2^2*L_6=V_3^2*L_7=V_4^2*L_8=V_5^2*L_1=V_6^2*L_2=V_7^2*L_3=V_8^2*L_4$ (i.e., the droplet 802 is aligned with the beam 811). In other words, the droplet 802 will move until the continuous reduction in the driving force due to the decrease in the length of contact between the circumference of the droplet and the individual electrodes 805 and 804 results in the equilibrium of the forces acting on the droplet. The size and number of the wedge-like gaps between the electrodes is designed in such a way as to insure that the motion of the droplet halts at the point where it is aligned with the light beam.

The foregoing merely illustrates the principles of the invention. It will thus be appreciated that those skilled in the art will be able to devise various arrangements which, although not explicitly described or shown herein, embody the principles of the invention and are within its spirit and scope. Furthermore, all examples and conditional language recited herein are intended expressly to be only for pedagogical purposes to aid the reader in understanding the principles of the invention and are to be construed as being without limitation to such specifically recited examples and conditions. Moreover, all statements herein reciting aspects and embodiments of the invention, as well as specific examples thereof, are intended to encompass functional equivalents thereof.

What is claimed is:

1. A tunable liquid microlens comprising:
   a first plurality of electrodes;
   a droplet of conducting liquid; and
   a layer of photo-conducting material through which a current passes responsive to light being incident upon said material, which results in a voltage differential between at least one of said first plurality of electrodes and said conducting liquid.

2. The tunable liquid microlens of claim 1 wherein said photo-conducting material comprises a conjugated polymer.

3. The tunable liquid microlens of claim 1 wherein said photo-conducting material comprises a doped charge transporting polymer.

4. The tunable liquid microlens of claim 1 wherein said photoconducting material comprises an inorganic photoconducting material.

5. The tunable liquid microlens of claim 1 wherein said photoconducting material comprises a photovoltaic material.

6. The tunable liquid microlens of claim 1 further comprising a transparent conducting substrate of a material that is transparent to at least one wavelength of light useful in an optical system.

7. The tunable liquid microlens of claim 1 further comprising a dielectric insulating layer that insulates said plurality of electrodes from said droplet.

8. The tunable liquid microlens of claim 1 further comprising a second plurality of electrodes wherein each electrode in said second plurality of electrodes is electrically coupled with at least one electrode in the first plurality of electrodes.

9. The tunable liquid microlens of claim 1 wherein a voltage across said conducting liquid is constant.

10. A tunable liquid microlens comprising:
    a first plurality of electrodes;
    a droplet of conducting liquid; and
    a layer of photovoltaic material through which a current passes responsive to light being incident upon said material, which results in a voltage differential between at least one of said first plurality of electrodes and said conducting liquid.

11. The tunable liquid microlens of claim 10 further comprising a transparent conducting substrate of a material that is transparent to at least one wavelength of light useful in an optical system.

12. The tunable liquid microlens of claim 10 further comprising a dielectric insulating layer that insulates said plurality of electrodes from said droplet.

13. The tunable liquid microlens of claim 10 further comprising a second plurality of electrodes wherein each electrode in said second plurality of electrodes is electrically coupled with at least one electrode in the first plurality of electrodes.

14. The tunable liquid microlens of claim 10 wherein a voltage across said conducting liquid is constant.

15. A method for use in aligning a light beam incident upon a photoconducting material with a droplet of conducting liquid, said method comprising:
    receiving the light beam;
    passing a current, responsive to said light beam, through at least a first photo-conducting layer coupled to said first plurality of electrodes to create a voltage differential between said droplet and at least one of a first plurality of electrodes; and
    adjusting the voltage applied to said at least one of a first plurality of electrodes in order to cause said droplet to move and become aligned with said light beam.

16. A method for use in aligning a light beam with a droplet of conducting liquid in a tunable liquid microlens, wherein each of a first plurality of electrodes is electrically coupled to an opposing electrode in a second plurality of electrodes, said method comprising:
    receiving a light beam incident upon at least a first layer of photo-conducting material; and
    adjusting said droplet, in response to a voltage differential between said droplet and at least one of said second plurality of electrodes, in a way such that said droplet becomes aligned with said light beam.

* * * * *